Jan. 1, 1935.  A. WINTHER ET AL  1,986,037
TRANSMISSION
Filed June 23, 1933  6 Sheets-Sheet 6

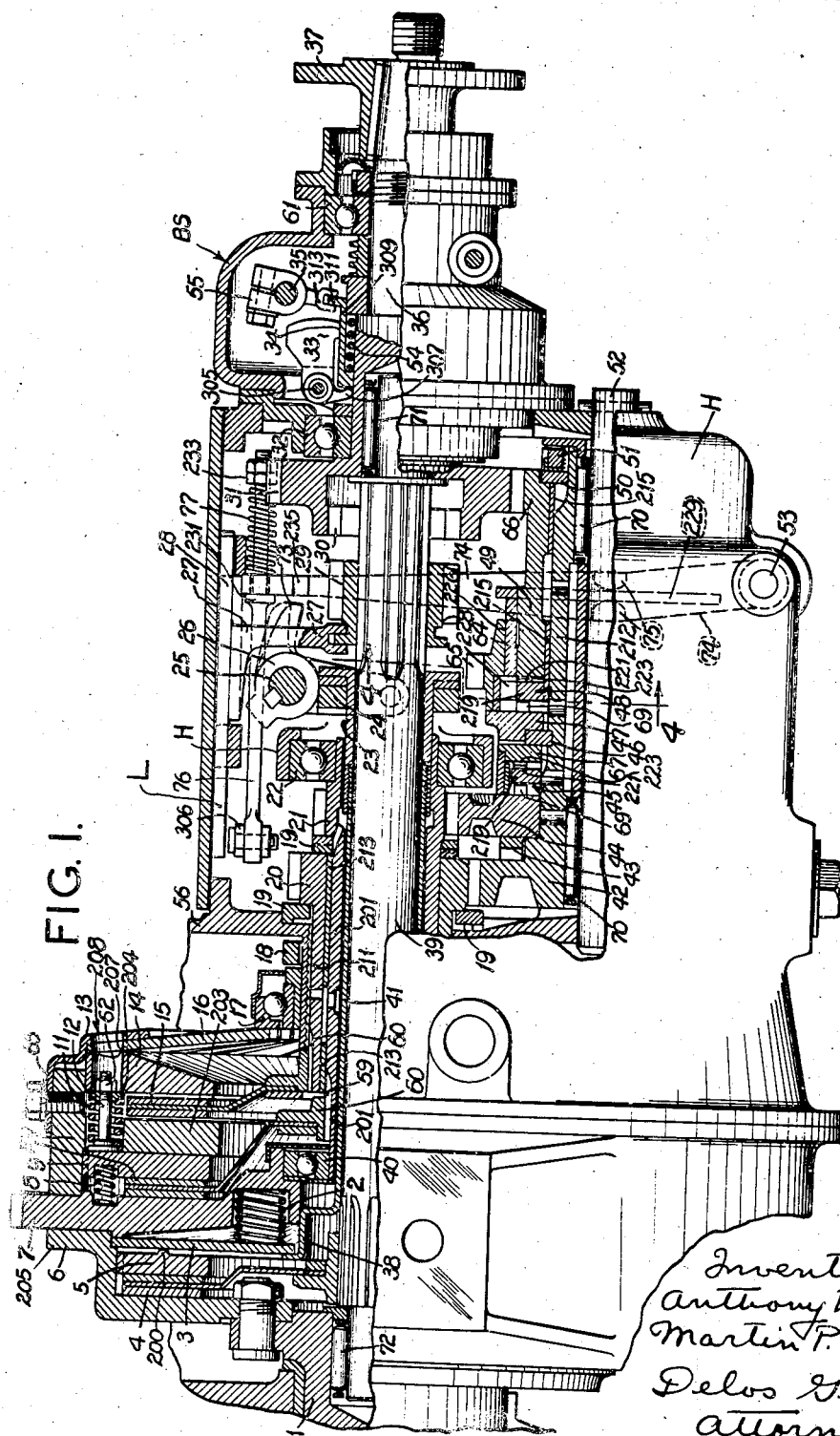

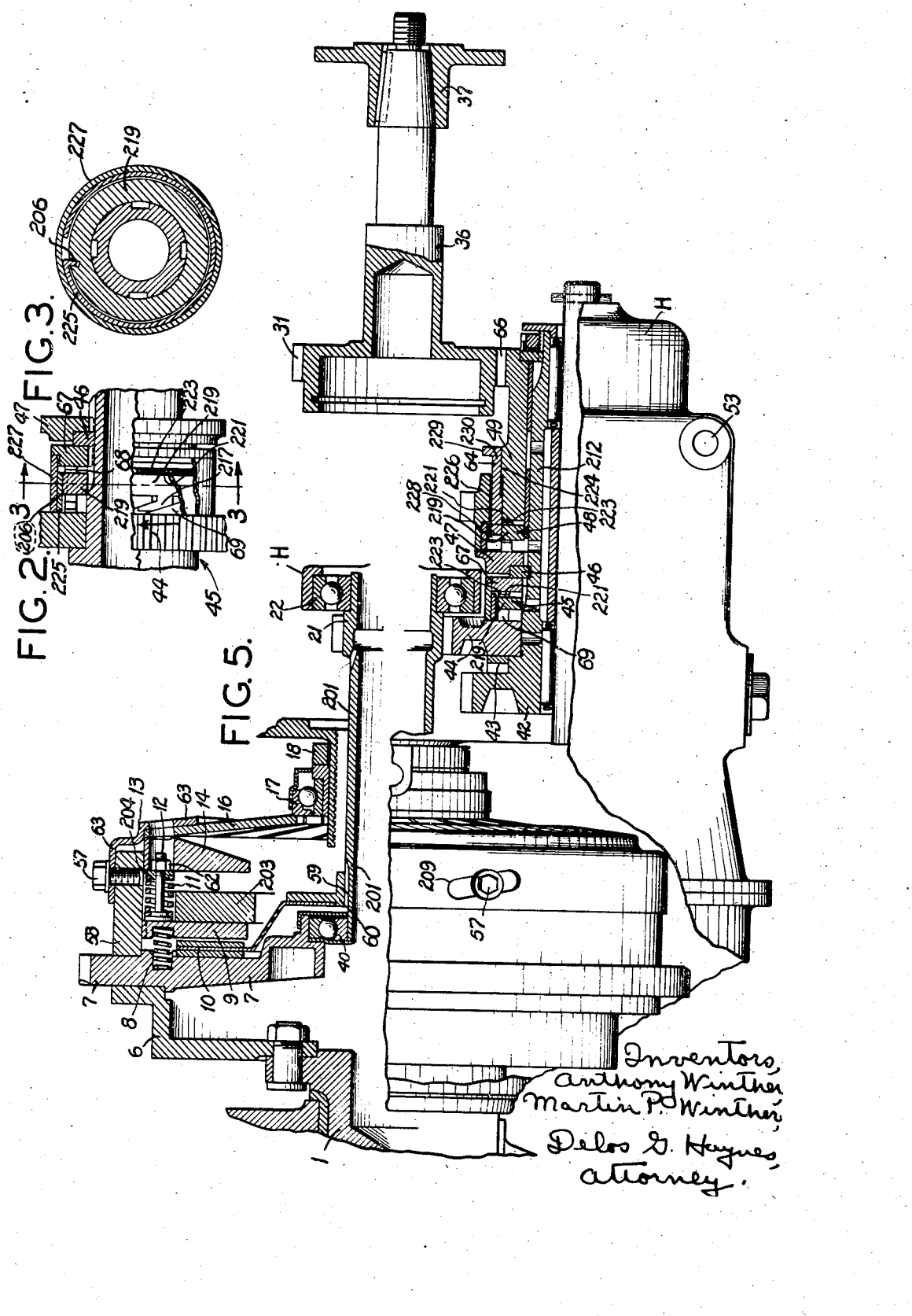

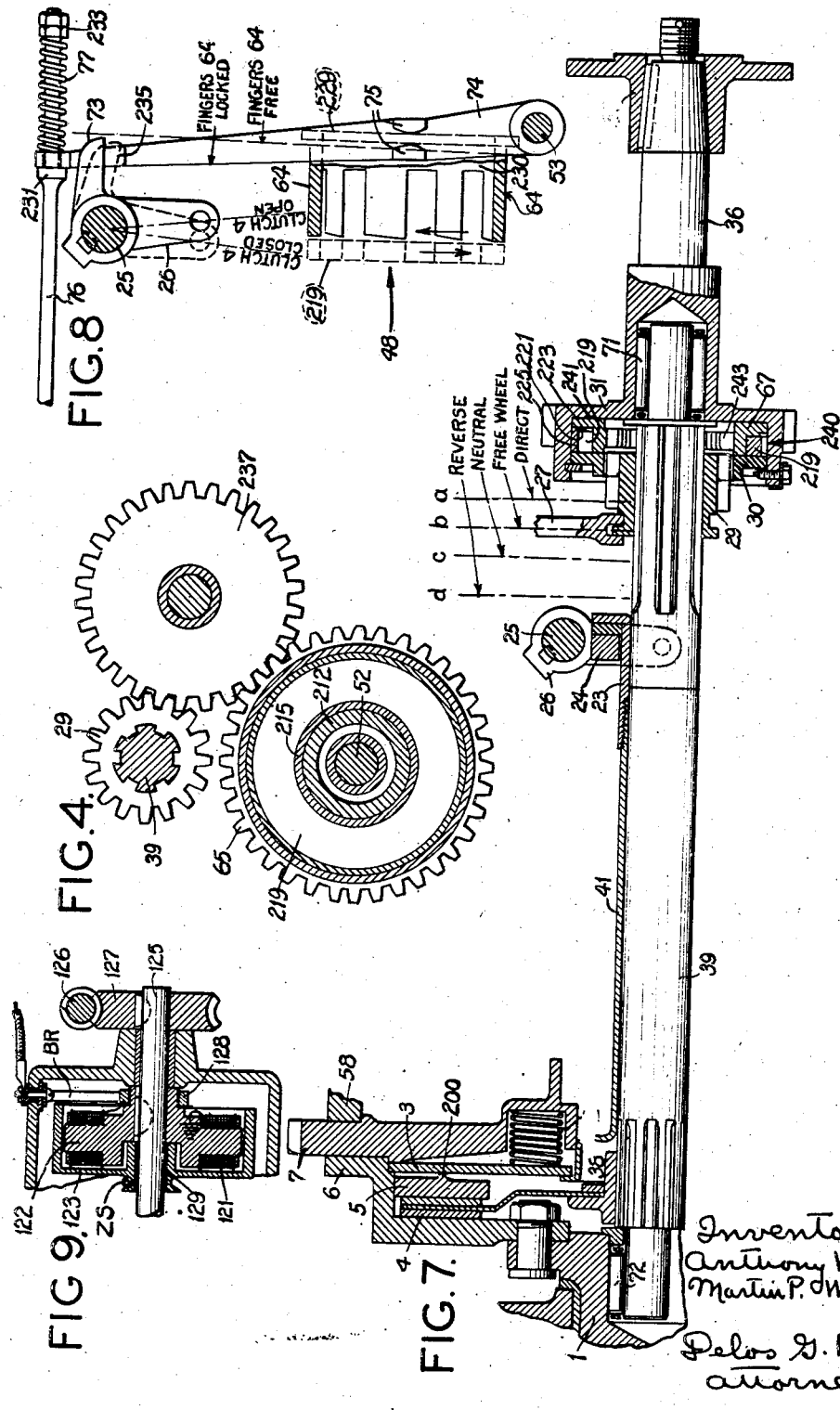

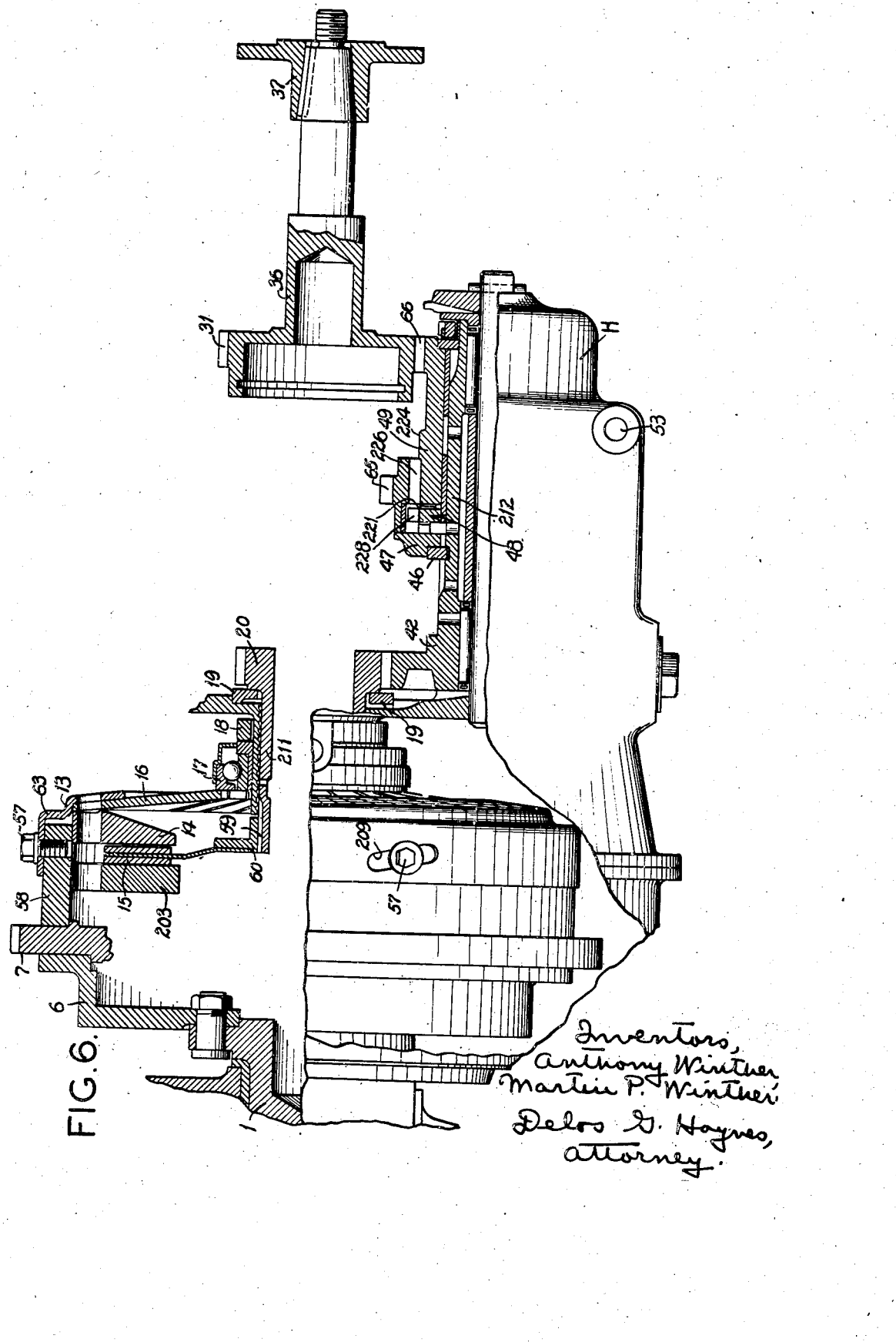

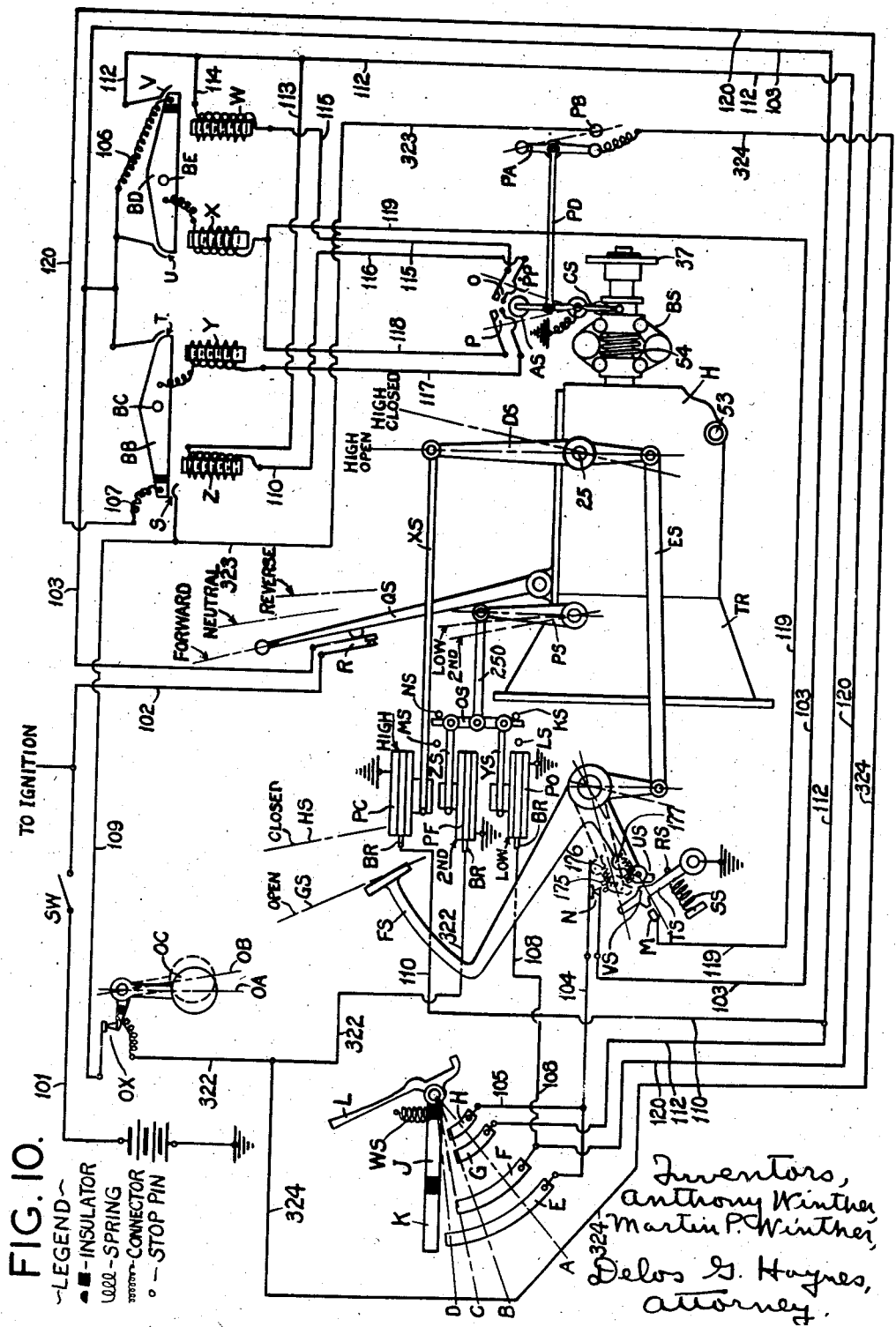

Patented Jan. 1, 1935

1,986,037

UNITED STATES PATENT OFFICE 1,986,037

TRANSMISSION

Anthony Winther, Kenosha, Wis., and Martin Phillip Winther, Waukegan, Ill.

Application June 23, 1933, Serial No. 677,289

24 Claims. (Cl. 74—336.5)

This invention relates to power transmissions, and with regard to certain more specific features, to manually or automatically operable transmissions adapted particularly for motor vehicles and the like.

Among the several objects of the invention may be noted the provision of a transmission by means of which the mechanical advantage of a constant torque prime mover, with respect to the variable torque elements driven thereby (such as the wheels of a vehicle) may be quickly and silently changed over a range of finite steps (four, including reverse, in the present example); the provision of a transmission of the class described which is easily adaptable to automatic operation by an associated system consisting, for example, of a compressed air control, vacuum control, hydraulic control and/or electrical control; the provision of a manual or automatic transmission in which any gear, forward or reverse, may be quickly and silently engaged; the provision of a simple device of this class having for its primary mechanical elements units of known reliability, such as simple gear trains and friction clutches; and the provision of a transmission of the class described which shall operate simply, smoothly, without undesirable indication of the changes effected, and one in which the operation is fool proof and in which said clutches may be opened and closed without critical discrimination. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a longitudinal section showing the primary mechanical elements of the transmission, parts thereof being shown in side elevation;

Fig. 2 is an enlarged exemplary detail of certain overrunning clutches employed in the construction of Fig. 1;

Fig. 3 is a cross section taken on line 3—3 of Fig. 2;

Fig. 4 is a cross section taken on line 4—4 of Fig. 1, the same showing a reverse gear train;

Fig. 5 is a view similar to Fig. 1 but showing only certain primary parts which function for low gear operation;

Fig. 6 is a view similar to Fig. 5 showing only certain primary parts which function for intermediate, or second gear operation;

Fig. 7 is a view similar to Fig. 5 but showing only certain parts functioning for high gear operation and also showing the alternative application of a free-wheeling device, not shown in Fig. 1 but provided for in Figs. 5 and 6;

Fig. 8 is a side elevation showing a detail of an interlocking mechanism;

Fig. 9 is a longitudinal section showing a detail of a clutch closing relay or selector unit;

Fig. 10 is a wiring diagram illustrating a system for automatically operating the transmission; and, Fig. 11 is a view similar to Fig. 10 showing a modified fragmentary part of Fig. 10.

Similar reference characters indicate corresponding parts throughout the several views of the drawings.

Figure 11:
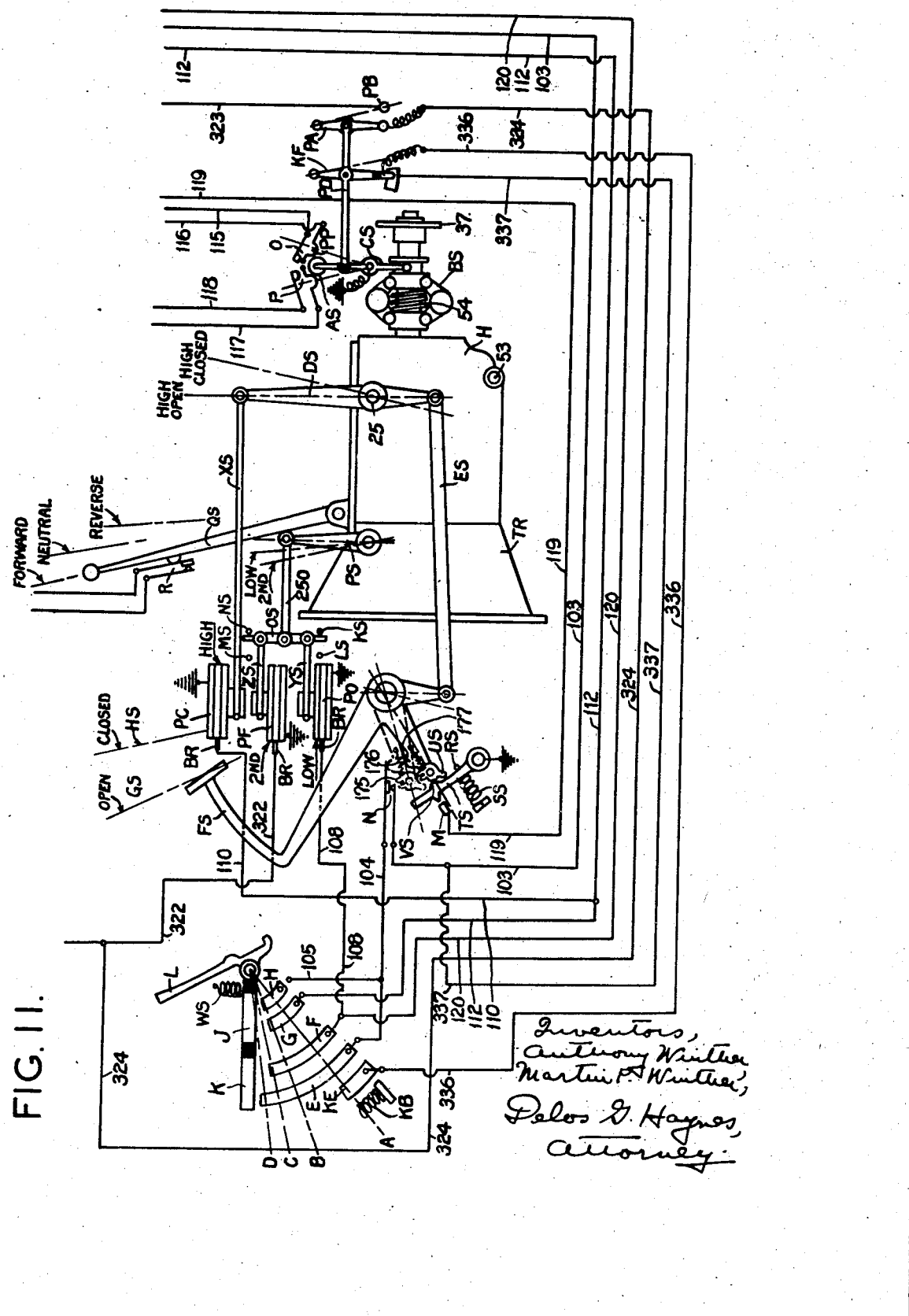

In order to clarify the description, the mechanical elements of the transmission will first be particularized and thereafter an electrical control will be described whereby the mechanical elements are rendered automatically operable. It is to be understood that the mechanical elements may be manually controlled if this be desired, but automatic operation is shown herein.

Referring now more particularly to Fig. 1, there is shown at numeral 1 a flange which is connected to the prime mover and will be hereinafter referred to as a driving element. Bolted to the flange 1 is part 6 of a clutch casing which partially serves as a fly wheel for the prime mover. The member 6 has attached thereto a starter gear element 7 which also extends inwardly to form a diaphragm, as shown.

The driven member of the transmission is indicated at numeral 37, said member comprising a flange for making a coupling to other driven elements, such as the drive shaft of an automobile. The flange 37 is keyed to a quill 36 supported on bearings 32 and 61 of a stationary housing H which otherwise encloses the transmission as a whole. The inner end of the quill 36 constitutes both a driven exterior gear 31 and an integral annular coupling gear 30. In Figs. 5 to 7, provision is made at this point for a free-wheeling unit but this is optional.

An external gear 29 is adapted to move into interior engagement with the coupling gear 30 under driving conditions. Inasmuch as there are equal numbers of teeth in each, they function when engaged as a radial crown coupling. The gear 29 is slidably splined upon the splined end of an intermediate quill 39. The quill 39 is supported in pilot bearings 71 and 72 within the quill 36 and flange 1, respectively. The gear 29 may be moved back and forth upon its spline by means of a shifter fork 27.

Splined to the left end of the quill 39 is the driven member of a fixed clutch 4, said clutch having a pressure plate 5. It will be understood that the pressure plate 5 is longitudinally movable with respect to the casing 6 but does not rotate with respect thereto and any of the usual peripheral splining or like methods are used to accomplish this result.

Springing clutch levers 3 supported at their outer ends by clamping action between the diaphragm member 7 and a recess in the case 6 are adapted to force the plate 5 against the clutch to close the clutch 4, this being accomplished by contact at lugs 200. The clutch levers 3 are normally pressed towards clutch closing position by means of springs 2 reacting from sockets within the diaphragm 7.

The levers 3 may be drawn to the right, against the reactions of springs 2, by means of a flange 38 formed with a tube 41, said tube being slidable on the quill 39 and reaching toward the right where it is threadably engaged by an actuating flange 23. The flange 23 may be moved longitudinally on the quill 39 by means of a throw-out bearing 24 operated by a shifter fork 26 keyed to an operating shaft 25. Thus it will be seen that the clutch 4 may be opened and closed from the operating shaft 25, opening being effected against the reaction of springs 2.

A second clutch 10 has its driven member splined at 59 to a sleeve 201 supported in a bearing 40 in the diaphragm 7 and in a bearing 22, said bearing 22 being supported in the housing H. The pressure plate 9 of the clutch 10 is also splined in the usual manner to the extension 58 of case 6, and separating springs 8 normally tend to hold the clutch open. The movement of the pressure plate 9 to the right is limited by a second diaphragm 203 formed as a part of the extension 58 from the housing 6.

On the back of the pressure plate 9 of the clutch 10 are fastened studs 12 having adjustable heads formed by nuts 62. These nuts 62, through suitable washers 204 place a pre-loading upon springs 11 which react between said heads 62 and the pressure plate 9.

A third pressure plate 14, also splined to the member 58 of housing 6 engages the washers at the ends of springs 11. Any movement of the pressure plate 14 thus may be transmitted to the intermediate pressure plate 9 by way of the preloaded springs 11 and thus close the clutch 10.

The purpose of the pressure plate 14 is as above stated, and to press upon a driven element of a third clutch 15. After the clutch 10 has closed under advance of the pressure plates 14 by its action through the spring 11 and pressure plate 9, the springs 11 further compress from their preloaded condition and permit further advance of the plate 14 after the advance of plate 9 has closed clutch 10, thus to permit the plate 14 to press against the driven member of clutch 15, and thus closing the same.

In order to operate the clutch plate 14 to control clutches 10 and 15, levers 16 are provided having outer fulcrums in a shoulder 13 of an adjusting ring 63 and operating upon said plate 14 at a fulcrum 207. The levers 16 reach inwardly and are operable by endwise motion of a fork 18 which operates a throw-in bearing 17. The ring 63 may be adjusted longitudinally by loosening cap screws 57 which hold the same and turning the ring 63, the sloping slots 209 therein controlling the longitudinal movement (Figs. 5 and 6). Openings 208 through the rings 13, levers 16 and clutch plate 14 provide access for adjusting the preloading heads 62 so that the functions hereinafter set forth may be accomplished.

The driven element of clutch 15 is splined to a sleeve 211 which is borne on bearings 213 around said sleeve 201. The sleeve 211 carries at its rearward end a gear 20 which is held between thrust bearings 19.

The gear 20 meshes with gear 42 which has an integral extension 212 supported by bearings 70 on a counter shaft 52. Driving rings 67 and 47 are splined to the extension 212 of gear 42 and a split ring 46 is used for locating rings 67 and 47 (see also Fig. 2).

The gear 21 is meshed with a gear 44, said gear 44 being rotatable on the extension 212 of gear 42. A spring ring 43 reacting between gears 42 and 44 functions as an anti-shock device.

A sleeve 49 carried on bearings 215 on the sleeve 212 is integrally formed with a gear 66 which meshes with said gear 31.

The ring 67 is driven by the gear 44 through an overrunning clutch, designated in general by numeral 45. The sleeve 49 is driven from the ring 47 by means of another overrunning clutch designated in general by numeral 48. These clutches will be particularized.

The gear 42 with its integral sleeve 212 with splined ring 67 are under certain conditions, adapted to overrun the gear 44. Under such conditions the ring 47 which is also splined to the sleeve 212 drives the sleeve 49 through the then closed clutch 48 so as to drive gears 66 and 31. When there is no overrunning, the gear 44 drives the ring 67 by way of clutch 45 and thus the sleeve 49 is driven through sleeve 212, ring 47 and then closed clutch 48. Thus it is clear that the sleeve 49 may be driven either from the gear 42 or the gear 44 depending whether or not overrunning conditions exist.

In order that the above description may be made clearer, I have shown in Figs. 2 and 3 the working details of the clutches 45 and 48. Clutches of this nature have been described in Patent 1,849,212, issued March 15, 1932, to A. Winther. The clutch shown in Fig. 2 is for example, clutch 45 and consists of wedge members 69 attached to the driving member (gear 44, or ring 47, as the case may be). These wedge members have undercut portions which receive undercut wedge members 217 of an intermediate ring 219, the latter carrying serrations 221 cooperating with serrations 223 on the driven member (either ring 67 or sleeve 49, depending upon the clutch under consideration).

When the driving member such as gear 44 turns over (see the arrow in Fig. 2) the wedge members 69 wedge against the wedge members 217, thus driving the intermediate ring 219 to the right and causing the serrations 221 and 223 to cooperate so that the driven member 67 is driven. Should the driven member 67 overrun the driving member 44 in the same direction, the undercut wedge members 217 move into the wedge members 69 and cause the intermediate ring 219 to be drawn to the left so that the serrations 221 and 223 are drawn out of engagement. To assure complete clearance of the serrations 221 and 223, a frictional spring ring 225 is arranged between the fixed extension 227 of the driven member 67 and the said intermediate ring 219, which, as overrunning continues, continues to frictionally carry the intermediate ring 219 definitely out of engagement so that the serrations 221 and 223 definitely clear without chattering. The spring is fastened as at 206 to the intermediate member 219 and frictionally contacts the extension 227. The extension is fast on the driven element 67. It will be understood that this is the class of clutch which is preferred at 45 and 48, but that other overrunning clutches may be used if the same be designed to give equivalently smooth action. Further details thereof may be found in said patent.

Cluch 48 includes a variation which consists in providing in the intermediate ring 219 openings 228 for receiving locking fingers of a lock clutch 64 which pass through openings in the sleeve 49. When the locking fingers of clutch 64 are pushed to the left, they will enter the openings 228 and thus lock the clutch 48 so that the ring 47 is locked with respect to the sleeve 49. The purpose of this will be shown.

In order that the locking fingers of clutch 64 may be moved, a sliding yoke 229 is provided on sleeve 49 and operable by means of dogs 75 on a lever 74 pivoted to the housing at 53 and operated from above by a rod 76 passing through the end of said lever 74 (Figs. 1 and 8). The lever 74 is normally pressed to a shoulder 231 of said rod 76 by spring 77 reacting from adjusting nuts 233 on the rod 76. The details of this feature are shown in Fig. 8. The fingers of clutch 64 pass through the openings 226 in the sleeve 49, as well as said openings 228. The ring 230 which holds together the fingers of clutch 64 bears at 224.

Figs. 1 and 8 also show an interlock between shaft 25 and said lever 74. The interlock comprises a finger 73 extending from said fork 26. This interlock is so arranged that when the shaft 25 is turned clockwise (Figs. 1 and 8) and the high gear clutch 4 thus permitted to close, the locking clutch fingers 64 must first be withdrawn from locking position in the recesses 228. This is accomplished by the finger 73 riding upon a support 235 on the lever 74 as long as the lever 74 is in counterclockwise position (Fig. 8) and slipping from said support when the lever 74 is in clockwise position (Fig. 1). Thus, the jaw clutch fingers 64 cannot be placed in locked position (lever 74 counterclockwise) until the clutch 4 is opened (fork 26 in solid line position Fig. 8); and the clutch 4 cannot be closed until the jaw clutch 64 has been placed in its free position (clockwise position, Fig. 8). It will be seen that the take-up spring 77 permits of pulling over the rod 76 without moving the lever 74, as when it is interfered with by the finger 73. Then as soon as the interference ceases the spring 77 drives the lever 74 to counterclockwise position. The rod 76 in the embodiment of the invention under present consideration is manually operated.

In Fig. 4 is shown a reversing gear 237 which constantly meshes with the gear 65 which forms a part of the sleeve 49. Said gear 237 is adapted to be engaged by gear 29 when said gear 29 is moved forwardly, whereby reverse operation may be effected (see also Fig. 7).

The operation of the mechanical elements is as follows:

When gear 29 engages with teeth 30 the transmission is prepared for forward operation. Then any or all friction clutches 4, 10, or 15 may be closed for driving at will with suitable manual or automatic attachments, an example of which will be later described. Under these conditions the closed clutch having the least gear speed reduction or mechanical advantage to shaft 36 will do the driving and other clutches whether open or closed will not effect movement of the car. In this transmission clutches can be opened and closed without discrimination. Further, when operating in direct drive there is normally no relative motion between clutch friction plates and the driving surfaces.

Low speed (Fig. 5) is effected when the high speed clutch 4 (not in Fig. 5) is open and bearing 17 is advanced only sufficiently to close the low gear clutch 10 through members 16, 14, 11, and 9. This leaves intermediate gear clutch 15 open (not in Fig. 5). As stated, adjustment of clutch 10 relative to clutch 15 is provided at nut 62. Springs 11 of which there are several are preloaded under the heads 62. Springs 8 are the separating means for both clutches 10 and 15.

Thus with low gear clutch 10 closed and the high and intermediate gear clutches 4 and 15 open, the drive will be from flange 1, through case 6, 58, diaphragm 7 and pressure plate 9 clamping on the driven disc of clutch 10, splined hub 59, tube 201, gear 21, gear 44, overrunning clutch 45, tube 212, ring 47, overrunning clutch 48 (whether locked or unlocked by the fingers 64), sleeve 49, gear 66, gear 31, quill 36 and driven flange 37.

Intermediate speed is effected (Fig. 6) when high speed clutch 4 (not shown in Fig. 6) is open and bearing 17 is advanced beyond low speed position a sufficient distance to compress springs 11 and engage pressure plate 14 with intermediate gear clutch 15. At this time low gear clutch 10 is closed (not shown in Fig. 6). When intermediate gear clutch 15 is closed gear 20 will advance gear 42 to a higher relative rotation than that of gear 44 causing overrunning clutch 45 to release. Driven ring 67 at this time overruns gear 44. Thus the intermediate gear train runs ahead of the low speed train and takes up the load.

Under intermediate or second speed conditions as shown in Fig. 6 the drive comprises flange 1, casing parts 6 and 58 including the second diaphragm 203, the pressure plate 14 acting with 203 as a clamp upon the driven member of clutch 15, splined hub 60, tubular member 211, gear 20, gear 42, tubular member 212, formed therewith, ring 47, overrunning clutch 48, sleeve 49, gear 66, gear 31, quill 36 and driven flange 37.

To connect direct speed from low or intermediate speeds, the high speed clutch 4 is closed by releasing the described holding means against levers 3, namely parts 38, 41, 23, 24, 26, 25 (Fig. 1).

As the direct high speed clutch 4 closes under action of springs 2, gear 29 in crown contact with gear 30 will cause gears 31 and 66 to advance ahead of driving ring 47 and hence ahead of gear 42, thereby releasing overrunning clutch 48. Now overrunning clutches 45 and 48 are both disengaged and all friction clutches 4, 10 and 15 are closed. The members involved in the high gear drive are flange 1, casing 6, pressure plate 5, driven member of clutch 4, quill 39, gear 29, gear 30, quill 36 and driven flange 37 (Fig. 7).

In Fig. 7, an alternative overrunning, freewheeling clutch 240 is shown between the gears 30 and the gear 31 on quill 36. This overrunning clutch 240 is of the same construction as overrunning clutches 45 and 48, like numerals designating like details as indicated in Figs. 2 and 3. It will be seen in this connection that gear 30 instead of as in Fig. 1 being integral with the quill 36, is separate therefrom and only drives the quill through the overrunning clutch 240. When there is a tendency for the driven quill 36 to drive the intermediate quill 39 through the gear 29, overrunning occurs from the rear wheels of the vehicle to the engine.

It is the intention to have the free wheeling feature optionally operable, and therefore, the member 241 is fixed to the quill 36. It is formed as an internal gear 243 which is adapted to be reached by movement of the gear 29 and lever 27 to position $a$ shown in Fig. 7, and thus function in high gear drive as the equivalent of the construction shown in Fig. 1, that is, non-free-wheeling. It will be understood that in Fig. 1, for simplicity and completeness of description of all forms, no free-wheeling unit is shown at this point. It will be noted in connection with Figs. 5 and 6 that the gear 31 has been provided with means for accommodating the free-wheeling clutch 240. If desired, the entirely non-free-wheeling arrangement shown at this point in Fig. 1 may be used.

Referring again to Fig. 7, when the lever 27 is in position $a$, as stated, no free-wheeling is effected between the wheels of the vehicle and the engine. When the lever 27 is in position $b$ free-wheeling is effected between the rear wheels and the engine, the drive otherwise functioning in the manner above described. When the lever 27 is in position $c$, it is in neutral, and high gear operation can be effected whenever desired, and also low or intermediate gear operation. When the lever 27 is in position $d$, the gear 29 meshes into the reverse gear train as shown in Fig. 4 and reverse operation may be effected.

It will now be seen that releasing low and intermediate gear clutches 10 and 15 will not affect gear train operation in high gear. Clutches 10 and 15 may be opened or closed while clutch 4 is closed without in any way affecting operation because they are connected to driving trains which lag behind the high gear train.

When low and intermediate gear clutches 10 and 15 are closed and high gear clutch 4 is intermittently opened and closed, overrunning clutch 48 will alternately open and close automatically. Then the transmission will alternate between high gear and intermediate gear. When low gear clutch 10 is closed and high and intermediate gear clutches 4 and 15 are open the transmission is in low and clutches 45 and 48 are both closed. Now if the intermediate gear clutch 15 is alternately opened and closed, overrunning clutch 45 will alternately open and close automatically, thereby changing between intermediate and low speeds.

Jaw clutch fingers 64 are shown in engaged position in Fig. 5 and disengaged in Fig. 1. For normal operation where engine braking is not used, these fingers 64 are withdrawn from the clutch 48 so that the latter may overrun normally. For engine braking they are locked and due to the interlock the high speed power clutch 4 must be open.

Referring to Fig. 1, there are shown at numerals 33, centrifugally operated weights borne on a shaft 305 and having fingers 307 for engaging a sleeve 309 located on said quill 36. The sleeve 309 is normally urged to the left by spring 54. It is flanged as shown at 311 to cooperate with a clevis member 313 of a lever 55 clamped to a cross operating shaft 35.

For automatic operation governor spring 54 is preloaded to a predetermined value and calibrated to act with the centrifugal weights 33 to engage or prepare a preselector (to be described) for engaging certain gear trains at predetermined speeds of the vehicle.

When an operating lever or rod 306 (which may extend by suitable means to the driver's position) is set for intermediate gear, locking spring 77 is preloaded against fork 74 which tends to press the jaw clutch fingers 64 into the openings 228 in the ring 219 of the overrunning clutch 48. While the jaws of the clutch 64 are biased so they will not engage under one relative direction of rotation (see Fig. 8), they will drop into engagement with ring 48 when rotating speeds between ring 219 of the clutch 48 and fingers of the member 64 are synchronized. As stated, the interlock 73 is provided so that the fingers of the clutch 64 must withdraw before clutch 4 is engaged for either forward or reverse and vice versa.

The shifter clevis 27 is manually operated and, as stated, its function is to prepare the transmission for forward, forward free-wheel (optional) neutral and reverse.

When operating for reverse, overrunning clutches 45 and 48 will engage and rotate clutches 10 and 15 which are then open. For reverse, clutch 4 is manually operated in the conventional manner with a foot operated clutch pedal connected to the cross shaft 25. The desired velocity drop is obtained through the train 29, 237, 65, 66, 31 (Figs. 1 and 4).

As previously stated this transmission can be automatically operated by means of vacuum, air pressure, hydraulic and/or electric control. For this purpose an exemplary electric control is shown in Figs. 9 and 10. The control hereinafter described is one which meets the most exacting requirements for automatic operation.

The means used for operating each of the clutches of the transmission is a small electromagnetic clutch driven from the camshaft, or the like, of the prime mover of the vehicle. Its description is as follows (Fig. 9):

A worm 126 is in operative connection with the prime mover such as on the camshaft. Worm wheel 127 is keyed to a cross shaft 125 which in turn is keyed to a multiple pole magnet 122 carrying exciting coils 121. Brushes BR ride upon a slip ring 128 whereby exciting current is carried to coil 121 and then grounded. A steel drum 123 forms the return path for the magnetic flux from alternate north and south poles of the electro-magnet 122. The drum 123 is journalled on shaft 125 by means of a bushing 129. The drum 123 is formed with a cable groove for a clutch operating cable ZS.

When the magnet 122 is rotated in reference to drum 123 and current is fed to coils 121, a rotative magnetic drag is set up causing drum 123 to tend to rotate with the magnet.

The turning effort imposed upon drum 123 will within practical limits be proportional to the slip taking place between drum 123 and magnets 122. Hence as the resistance to movement at cable ZS is increased, the slip between 122 and 123 will increase with an increase in turning effort until a stop is struck. When this point is reached as when cable ZS (Fig. 10) pulls bar OS against a stop MS, drum 123 will stop rotating, and magnet 121 will continue to rotate, but continuing to exert a rotative effort upon the drum 123. Bar OS controls a lever PS through a link 250 which in turn effects control of clutches 10, 15, through bearing 17 and fork 18.

As long as the resistance against movement of the drum 123 is low, as when the respective clutch 4, 10 or 15 is first starting to be closed, the magnetic drag applies a relatively high angular velocity to the respective drum 123 and thus the clutch approaches closing position at a rapid rate. However, as soon as the clutch begins to be clamped shut, a high resistance is set up against rotation of the respective drum 123. The relative slip between the drum 123 and its magnet 122 is thus high, and the subsequent closing of the clutch is more gradual, thus preventing grabbing. The result is that there is no delay in clutch actuation inasmuch as the first, non-grabbing movement is fast, but the last gripping movement is slower and very smooth.

A plurality of the relays shown in Fig. 9 are used, one for each power clutch 4, 10 and 15, the same being lettered PC, PO and PF in Fig. 10.

The restoring springs 8 and 11 in the clutches 10 and 15 will return cables ZS and YS to their initial positions as quickly as the magnets 122 are de-energized by cutting off exciting current. The cable XS for clutch 4 is also returned by action of the restoring springs 2. Springs 8 and 11 tend to open their clutches 10 and 15 upon restoration but springs 2 tend to close their clutch 4. Likewise cables ZS and YS tend to close their clutches when tensioned while cable XS tends to open its clutch when tensioned.

The above electro-magnetic actuating means have been found to be at the present time superior to hydraulic, vacuum or air pressure control for the operation of transmission clutches. Some of the reasons for the above are the inherent fast and then slow action above described as a characteristic of this device for closing action, the constancy of repeated similar actions, and the fact that a rapid speeding of the prime mover will cause a relatively rapid clutch engagement and vice versa. This electro-magnetic drag type of clutch actuating relay device (Fig. 9) has proved to have the correct effort curve for clutch operation. When hydraulic and/or pneumatic controls are properly developed, they also may be used.

The transmission control per se, shown in Fig. 10 taken broadly consists of five primary units, namely (1) accelerator switch, J, K, L; (2) power relays, PC, PF, PO for high, second and low gears; (3) acceleration pendulum OC; (4) governor BS; and (5) relay switch W, X, Y and Z. Secondarily, there is the ignition switch SW, switch R for automatically opening circuits for neutral and reverse positions, governor switches O and P and a one-way switch TS for releasing high gear when pedal FS is depressed.

Pendulum OC comprises an acceleration detent whose function is to regulate the engagement of second or intermediate speed gear trains in the transmission. The pendulum OC is affected by acceleration due to increasing velocity or grade. Position OB of the pendulum will open switch OX thereby preventing second speed from becoming operative until switch points PB are closed, as will be particularized.

Relay switches W, X, Y, and Z are for connecting various lines with a positive snap action making for definite on or off positions.

Accelerator pedal switch J, K, L, having a return spring WS gives partial transmission control according to engine throttle positions.

Switch TS is spring loaded as indicated at SS and is forced open against a stop RS. When pedal FS is moved from closed position HS to open position GS, dog US which is normally held clockwise against a stop 175 by a spring 176 will ride over an extension VS on switch lever TS in such a manner as to engage contact M momentarily to operate relay coil X through line 119, closing switch V and energizing power relay PC through lines 101, switch SW, line 102, switch R, lines 103, 106, switch V, and lines 112, 110, thereby holding the high gear of the transmission in disengaged position against springs 2. When pedal FS moves back from position GS to HS, dog US will deflect over the extension VS on TS so that no contact with M will be made. Return of pedal FS causes lug 177 thereon to open contacts N.

The governor BS actuates contacts P, O, and PB thereby partially controlling transmission operation from vehicle speed, as will be further shown. The levers CS and PA of the said switch contacts P, O and PB are articulated by a connecting rod PD. The governor is shown conventionally in Fig. 10.

The hand lever QS is manually operated by the vehicle driver. When set in forward position, full automatic action of the transmission in all forward speeds is effected. When set to neutral, the transmission is in neutral position and all control circuits are open. When set in reverse position, the transmission is in position to reverse by the conventional operation of clutch pedal FS as in the common and known type of automotive transmission.

Lever PS actuates clutch throw-in bearing 17 through fork 18 for operation of the low and second speed clutches 15 and 10 and is controlled by combination action of magnetic clutches PO and PF. Lever DS actuates cross shaft 25 for manipulation of the high speed clutch 4 in the transmission. It is controlled by the separate magnetic clutch PC.

The operation of the transmission and control is as follows:

Assume that the engine is running and lever QS is in forward position. Governor BS is collapsed due to the initial loading of spring 54. Contacts P, by momentary grounding through lever CS will have actuated magnets X and Y (see lines 117 and 118, switches T, U, line 103, switch R, line 102, switch SW and line 101) thereby closing switch V and opening all other control switches on levers BD and BB. Levers BD and BB pivot at BE and BC respectively. Control switch V will have energized power relay PC through lines 112 and 110 thereby opening high gear clutch 4.

There being no circuit through power relays PF and PO, the transmission is inoperative, clutches 10 and 15 being held open by springs 8. The same condition will prevail whenever the vehicle speed is below a predetermined speed of say, five miles per hour, according to governor spring setting. In this condition, the contacts N at pedal FS are closed, the pedal FS being in open or "down" position GS due to springs 2.

Next, the foot throttle switch L is moved in accordance with throttle opening, thereby gaining engine speed. This action will close contacts K, and E, and thus energize K as K reaches position D. Then when K is depressed to line C, it will contact F, energizing power relay PO through line 108 for low speed operation. It will also energize the switch point at S through wire 120. Relay PO will close the intermediate speed clutch 10 in the transmission by moving bar OS up against stop LS and the vehicle will accelerate in low speed.

When eight miles or some such predetermined vehicle speed is reached, governor BS will move contactor AS away from contacts P and ground only contacts PP. This grounding of contacts PP will energize magnet Z thereby closing contacts S, and T.

If the vehicle is headed down a grade sufficient to overcome the swing of pendulum OC due to car acceleration, the circuit will be completed from switch S through 109, OX, line 322 to second speed power relay clutch PF. Energizing PF will cause bar OS to be moved against stop MS pivoting at KS. Clutch relays PF and PO now being both energized, will hold bar OS against stops LS and MS, advancing lever PS to second speed position and clutches 10 and 15 will both be closed.

On the other hand, should the car be on nearly level ground, or going up grade, pendulum OC will be near position OB whereby contacts OX will be open, preventing engagement of second speed.

As the vehicle continues to accelerate in low speed gear, the value of the acceleration will decrease, gradually advancing pendulum OC to near point OA, whence contact OX will be made and the closing for second speed will be effected as described.

Should the vehicle continue on a grade sufficient to hold pendulum OC near position OB until a relatively high vehicle speed is reached, the governor BS will advance switch lever PA to contact PB when switch OX will be shunted by wires 323, 324 and 322, thus energizing power relay PF, and closing the circuit for second speed relay PF.

During the above automatic maneuvering, contacts K and J may move from position C to position A without affecting any of the functions.

At a predetermined vehicle speed of said twenty-five miles per hour, governor BS contacts AS and O, thereby grounding the magnet coil W (see wire 115) and opening contact V. If the throttle lever L is moved sufficiently to contact G, H, by means of J, the circuit to the power relay device PC will still be made through 103, N, 104, 112, and 110 to relay PC, and the high speed clutch 4 will remain open, and thus maintain drive in second gear. Second gear will then remain operative no matter how fast the car may travel so long as the throttle opening remains greater than line B indicates.

However, the instant contact at G, H, and J is broken, due to a partial closure of the throttle, the circuit to the power relay PC will be opened, permitting the clutch spring in the high speed clutch 4 to close for high speed operation and to return pedal FS to close position HS, whence contact N will be opened, de-energizing the entire circuit to the accelerator switch K, J, L and leaving the device in high gear.

The advantageous operating features are as follows:

When the car stops, the engine is free from load. To accelerate, the throttle needs only be opened full or nearly full and the car starts in low gear, and remains in low gear until grade and acceleration rate or vehicle speed automatically effects closure for second speed operation. It remains in second speed operation so long as the throttle is full, or nearly full, open.

The operator can engage second speed from high speed position at any time by depressing pedal FS and locking jaw clutch 64. Thus the advantage of the braking action in second speed may be obtained down grade.

While automatically in second speed, should the grade become too steep, or the road become too heavy, or should the speed reduce to say eight miles per hour, the transmission will automatically drop into low speed, and when the need for low speed is over, immediately go to second speed without attention.

While accelerating, second gear picks up the load from low, and high picks up the load from second, without deceleration or closing the engine throttle.

When dropping from a high speed gear to a lower speed gear such as from high to second or second to low, or high to low, no jeck or jar is felt, the engagement of the clutches being very smooth, due to the electro-magnetic characteristics of the power relays PO, PF, PC.

More than three speeds can be included in the transmission by the addition of more clutches, gear trains and relay, or two only may be used.

It is to be understood that the lever QS is linked to the shifter fork 27 through a suitable linkage L (Fig. 1). Further details of this linkage are not included, because such are known.

In Fig. 11 is shown a modified form of circuit incorporating a change which permits the driver to engage the transmission gears without depressing pedal FS. That is, the driver will naturally depress gas pedal L to the floor when eager to get maximum acceleration from the car. Under these conditions (Fig. 11) bar K will strike spring KB. A slight pressure over normal on pedal L will depress spring KB until bar K assumes a position at line A where contact between K and KE will be made, shunting switch N through wires 336, switch KF, contact KG, wire 337 to wire 103.

Thus under these conditions depression of pedal FS is not necessary for engaging the transmission at the start.

Switch KF opens through influence of the governor BS at and above a predetermined speed. Hence, above such predetermined speed the transmission will not go into gear, even though pedal L be depressed sufficiently to contact K, and KE.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A transmission having a driving member, a driven member, high, intermediate, and low speed power clutches associated with the driving member; high, intermediate and low speed trains connecting the respective clutches with said driven member, means for opening and closing the high speed clutch, an overrunning clutch between the low speed train and the intermediate speed train, a second overrunning clutch between the intermediate speed train and the high speed train, means for locking said second overrunning clutch, and interlocking means associating said second overrunning clutch locking means and the high speed power clutch whereby the second overrunning clutch can only be locked when said high speed clutch is open, and said high speed clutch cannot be reclosed until said second overrunning clutch is again unlocked.

2. A transmission comprising a driving member, a driven member, a plurality of clutches associated with the driving member, one of which constitutes a high-speed clutch and the others constituting intermediate and low speed clutches, a plurality of power trains each connecting a respective clutch with the driven member, a speed responsive member associated with the driven member, means whereby the position of the speed responsive means under low speed thereof results in automatically opening said high gear clutch, a throttle, and means responsive to increase in throttle positions adapted to close the low speed clutch during low speed of the speed responsive means.

3. A transmission comprising a driving member, a driven member, a plurality of clutches associated with the driving member, one of which constitutes a high-speed clutch and the others constituting intermediate and low speed clutches, a plurality of power train each connecting a respective clutch with the driven member, a speed responsive member associated with the driven member, means whereby the position of the speed responsive means under low speed thereof results in automatically opening said high gear clutch, a throttle, means responsive to increase throttle positions adapted to close the low speed clutch during low speed of the speed responsive means, means for closing the intermediate speed clutch upon speed increase and an overrunning means between the power trains of the low and intermediate speed clutches.

4. A transmission comprising a driving member, a driven member, high, intermediate and low speed clutches associated with the driving member, high, intermediate and low speed power trains connecting the respective clutches to the driven member, a speed responsive member associated with the driven member, means whereby low speed positions of said speed responsive means result in automatically opening said high gear clutch, means whereby higher speed positions thereof automatically close the intermediate and low speed clutches, and means in said trains whereby the train having the lowest mechanical advantage between the driving and driven members shall be operative provided its clutch is closed.

5. A transmission comprising a driving member, a driven member, high, intermediate and low speed clutches associated with the driving member, high, intermediate and low speed power trains connecting the respective clutches to the driven member, a speed responsive member associated with the driven member, means whereby low speed positions of said speed responsive means result in automatically opening said high gear clutch means whereby higher speed positions thereof automatically close the intermediate and low speed clutches, means in said trains whereby the train having the lowest mechanical advantage between the driving and driven members shall be operative, and acceleration responsive means adapted to effect low speed power transmission under otherwise relative high speed conditions of the speed responsive means.

6. A transmission comprising a driving member, a driven member, at least high, intermediate and low speed power clutches associated with the driving member; high, intermediate and low speed power trains connecting the respective power clutches to the driven member, a speed responsive member associated with the driven member, means whereby low speed positions of said speed responsive means result in automatically opening said high speed power clutch, means whereby higher speed positions thereof automatically close the intermediate and low speed clutches, means in said trains whereby the train having the lowest mechanical advantage between the driving and driven members shall normally be operative, and throttle responsive means adapted to enforce low speed power transmission.

7. A transmission for an engine comprising a driving member, a driven member, high, intermediate and low speed clutches associated with the driving member, high, intermediate and low speed power trains connecting the respective clutches with the driven member, overrunning clutches between the low speed train and the intermediate speed train, and between the intermediate speed train and the high speed train, speed responsive means connected with the driven member and adapted to control all clutches to open and to relieve the engine of load at predetermined low speeds.

8. A transmission for an engine comprising a driving member, a driven member, high, intermediate and low speed clutches associated with the driving member, high, intermediate and low speed power trains connecting the respective clutches with the driven member, overrunning clutches between the low speed trains and the intermediate speed train, and between the intermediate speed train and the high speed train, speed responsive means connected with the driven member and adapted to open all clutches and relieve the engine of load at predetermined low speeds, a throttle, means whereby said throttle when substantially open closes the low speed clutch to effect low gear operation, and means whereby grade, acceleration rate or vehicle speed automatically and predeterminately close the intermediate speed clutch to effect second speed operation while the throttle is substantially open.

9. A transmission for an engine comprising a driving member, a driven member, high, intermediate and low speed clutches associated with the driving member, high, intermediate and low speed power trains connecting the respective clutches with the driven member, overrunning clutches between the low speed train and the intermediate speed train, and between the intermediate speed train and the high speed train, speed responsive means connected with the driven member and adapted to open all clutches and relieve the engine of load at predetermined low speeds, a throttle, means whereby said throttle when substantially open closes the low speed clutch to effect low gear operation, means whereby grade, acceleration rate or vehicle speed automatically and predeterminately close the intermediate speed clutch to effect second speed operation while the throttle is substantially open and means whereby an operator may manually close the intermediate speed clutch to effect intermediate speed operation at any time after high speed operation is effective.

10. A transmission for an engine comprising a driving member, a driven member, high, intermediate and low speed clutches associated with the driving member, high, intermediate and low speed power trains connecting the respective clutches with the driven member, overrunning clutches between the low speed train and the intermediate speed train, and between the intermediate speed train and the high speed train, speed responsive means connected with the driven member and adapted to open all clutches to relieve the engine of load at predetermined low speeds, a throttle, means whereby said throttle when substantially open closes the low speed clutch to effect low gear operation, means whereby grade, acceleration rate or vehicle speed automatically and predeterminately close the intermediate speed clutch to effect intermediate speed operation while the throttle is substantially open and effects automatic closure of the low speed clutch to return to low speed drive under predetermined load or speed conditions.

11. A transmission comprising a driving member, a driven member, high, intermediate and low speed clutches associated with the driving member, high, intermediate and low speed power trains connecting the respective clutches with the driven member, overrunning clutches between the low speed train and the intermediate speed train, and between the intermediate speed train and the high speed train, speed responsive means connected with the driven member and adapted to open all clutches to relieve the engine of load at predetermined low speeds, a throttle, and means whereby when said throttle is open said low speed clutch is closed to effect low gear operation.

12. A transmission comprising a driving member, a driven member, intermediate and low speed clutches associated with the driving member, intermediate and low speed power trains connecting the respective clutches with the driven member, overrunning clutches between the low speed train and the intermediate speed train, a throttle, means whereby when said throttle is open low gear operation is effected, means whereby grade, acceleration rate or vehicle speed automatically effect second speed operation as long as the throttle is substantially fully open, and means whereby low speed operation is again effected should the resisting torque become too great or the speed too low.

13. A transmission comprising a driving member, a driven member, high, intermediate and low speed clutches associated with the driving member, high, intermediate and low speed power trains connecting the respective clutches with the driven member, overrunning clutches between the low speed train and the intermediate speed train, and between the intermediate speed train and the high speed train, speed responsive means connected with the driven member and adapted to relieve load at predetermined low speeds, a throttle, means whereby opening of said throttle effects low gear operation, means whereby grade, acceleration rate or vehicle speed automatically effect second speed operation as long as the throttle is substantially fully open and under all vehicle speeds available in second gear, means whereby low speed operation is again effected should the resisting torque become too great or the speed too low, high gear operation being automatically effected under predetermined reduced throttle conditions.

14. A transmission comprising a driving member, a driven member, a plurality of clutches associated with the driving member, one of which constitutes a high-speed clutch and the others constituting an intermediate and a low speed clutch, a plurality of power trains connecting the respective clutches with the driven member, a speed responsive member associated with the driven member, means whereby the position of the speed responsive means under low speed thereof results in automatically opening said high speed clutch, a throttle, means responsive to increased throttle positions adapted to effect driving through the low speed clutch under said low speed of the speed responsive means, means whereby said speed responsive means effects operation by the intermediate speed clutch upon speed increase, and means responsive to acceleration forces adapted to prevent said operation by the intermediate speed clutch until a predetermined decrease in acceleration has occurred.

15. A transmission comprising a driving member, a driven member, a plurality of clutches associated with the driving member, one of which constitutes a high-speed clutch and the others constituting intermediate and low speed clutches, a plurality of power trains connecting the respective clutches with the driven member, overrunning means whereby the train having the lowest mechanical advantage and a closed clutch may drive a speed responsive member associated with the driven member, means whereby the position of the speed responsive means under low speed thereof results in automatically opening said high speed clutch, a throttle, means responsive to increase throttle positions adapted to effect driving through the low speed clutch under said low speed of the speed responsive means by opening the intermediate speed clutch, means whereby said speed responsive means effects closure of the intermediate speed clutch upon speed increase, and means responsive to acceleration forces adapted to prevent closure of the intermediate speed clutch until a predetermined decrease in acceleration has occurred, said speed responsive means and said means responsive to throttle position being adapted to effect closure of said high speed clutch at predetermined combinations of higher speeds and decreased throttle position.

16. A transmission comprising a driving member, a driven member, a plurality of clutches associated with the driving member, one of which constitutes a high-speed clutch and the others constituting intermediate and low speed clutches, a plurality of power trains connecting the respective clutches with the driven member, overrunning means whereby the train having the lowest mechanical advantage and a closed clutch may drive, and means responsive to speed and acceleration for automatically closing and opening said clutches to automatically effect a proper mechanical advantage.

17. A transmission comprising a driving member, a driven member, a plurality of clutches associated with the driving member, one of which constitutes a high-speed clutch and the others constituting intermediate and low speed clutches, a plurality of power trains connecting the respective clutches with the driven member, overrunning means whereby the train having the lowest mechanical advantage and a closed clutch may drive, means responsive to speed and acceleration for automatically closing and opening said clutches to automatically effect a proper mechanical advantage, and manually operable means for effecting intermediate speed operation from high speed operation at will.

18. A transmission comprising a driving member, a driven member, a plurality of clutches associated with the driving member, one of which constitutes a high-speed clutch and the others constituting intermediate and low speed clutches, a plurality of power trains connecting the respective clutches with the driven member, overrunning means whereby the train having the lowest mechanical advantage and a closed clutch may drive a speed responsive member associated with the driven member, means whereby the position of the speed responsive means under low speed thereof results in automatically opening said high speed clutch, a throttle, means responsive to increase of throttle positions adapted to effect driving through the low speed clutch under said low speed of the speed responsive means by opening the intermediate speed clutch, means whereby said speed responsive means effects closure of the intermediate speed clutch upon speed increase, means responsive to acceleration forces adapted to prevent closure of the intermediate speed clutch until a predetermined decrease in acceleration has occurred, said speed responsive means and said means responsive to throttle position being adapted to effect closure of said high speed clutch at predetermined combinations of higher speeds and decreased throttle position, and manually operable means for opening and closing the high speed clutch whereby intermediate speed driving may be effected at will.

19. A transmission comprising a driving member, a driven member, a plurality of clutches associated with the driving member, one of which constitutes a high-speed clutch and another of which constitutes a lower speed clutch, a plurality of power trains each connecting a respective clutch with the driven member, a speed responsive means associated with the driven member, means whereby the position of the speed responsive means under low speed thereby results in automatically opening said high speed clutch, a throttle, and means responsive to increase in throttle positions adapted to close the lower speed clutch during low speed of the speed responsive means.

20. A transmission comprising a driving member, a driven member, a plurality of clutches associated with the driving member, one of which constitutes a high-speed clutch and the others constituting intermediate and low speed clutches, a plurality of power trains each connecting a respective clutch with the driven member, a speed responsive member associated with the driven member, means whereby the position of the speed responsive means under low speed thereof results in automatically opening said high gear clutch, a throttle, means responsive to increase in throttle position adapted to close the low speed clutch during low speed of the speed responsive means, means for closing the intermediate speed clutch upon speed increase, an overrunning means between the power trains of the low and intermediate speed clutches, and overrunning means between the power trains of the high speed and intermediate speed clutches.

21. A transmission comprising a driving member, a driven member, a plurality of clutches associated with the driving member, one of which constitutes a high-speed clutch and the others constituting intermediate and low speed clutches, a plurality of power trains each connecting a respective clutch with the driven member, a speed responsive member associated with the driven member, means whereby the position of the speed responsive means under low speed thereof results in automatically opening said high gear clutch, a throttle, means responsive to increase in throttle position adapted to close the low speed clutch during low speed of the speed responsive means, means for closing the intermediate speed clutch upon speed increase, an overrunning means between the power trains of the low and intermediate speed clutches, overrunning means between the power trains of the high speed and intermediate speed clutches, and means for manually locking the overrunning means between said trains of the high speed and intermediate speed clutches.

22. A transmission comprising a driving member, a driven member, high, intermediate and low speed clutches associated with the driving member, high, intermediate and low speed power trains connecting the respective clutches to the driven member, a speed responsive member associated with the driven member, means whereby low speed positions of said speed responsive means result in automatically opening said high gear clutch, throttle means adapted to effect closure of the low speed clutch, acceleration responsive means adapted upon decrease of acceleration to effect closure of the second speed clutch, and means in said trains whereby the train having the lowest mechanical advantage between the driving and driven members shall be operative provided its clutch is closed.

23. A transmission comprising a driving member, a driven member, high and low speed clutches associated with the driving member, high and low speed power trains connecting the respective clutches to the driven member, a speed responsive member associated with the driven member, means whereby low speed positions of said speed responsive means automatically opens the high speed clutch, means whereby higher speed positions automatically close the low speed clutch, means in said trains whereby the train having the lowest mechanical advantage between the driving and driven members shall be operative, and acceleration responsive means adapted to effect low speed power transmission under otherwise relatively high speed conditions of the speed responsive means.

24. A transmission comprising a driving member, a driven member, a plurality of clutches associated with the driving member, one of which constitutes a high-speed clutch and another of which constitutes a low speed clutch, a plurality of power trains connecting the respective clutches with the driven member, overrunning means whereby the train having the lowest mechanical advantage and a closed clutch may be driven, and means responsive to speed and acceleration for automatically closing and opening said clutches to automatically effect a proper mechanical advantage.

ANTHONY WINTHER.
MARTIN PHILLIP WINTHER.